(12) United States Patent
Divan et al.

(10) Patent No.: US 7,105,952 B2
(45) Date of Patent: Sep. 12, 2006

(54) DISTRIBUTED FLOATING SERIES ACTIVE IMPENDANCES FOR POWER TRANSMISSION SYSTEMS

(75) Inventors: Deepakraj M. Divan, Madison, WI (US); Robert Schneider, Middleton, WI (US); William E. Brumsickle, Madison, WI (US)

(73) Assignee: Soft Switching Technologies Corporation, Middleton, WI (US)

( * ) Notice: Subject to any disclaimer, the term of this patent is extended or adjusted under 35 U.S.C. 154(b) by 184 days.

(21) Appl. No.: 10/678,966

(22) Filed: Oct. 3, 2003

(65) Prior Publication Data

US 2005/0073200 A1    Apr. 7, 2005

(51) Int. Cl.
G05F 1/66    (2006.01)
G05F 1/07    (2006.01)
(52) U.S. Cl. .......................... 307/98; 323/207
(58) Field of Classification Search .......... 307/98, 307/99; 323/207
See application file for complete search history.

(56) References Cited

U.S. PATENT DOCUMENTS

| | | | |
|---|---|---|---|
| 4,551,700 A * | 11/1985 | Waldemar | 336/192 |
| 4,829,298 A * | 5/1989 | Fernandes | 340/870.27 |
| 5,157,319 A | 10/1992 | Klontz et al. | |
| 5,198,746 A | 3/1993 | Gyugyi et al. | |
| 5,301,096 A | 4/1994 | Klontz et al. | |
| 5,329,222 A | 7/1994 | Gyugyi et al. | |
| 5,341,083 A | 8/1994 | Klontz et al. | |
| 5,341,280 A | 8/1994 | Divan et al. | |
| 5,343,139 A * | 8/1994 | Gyugyi et al. | 323/207 |
| 5,465,203 A | 11/1995 | Bhattacharya et al. | |
| 5,469,044 A | 11/1995 | Gyugyi et al. | |
| 5,513,090 A | 4/1996 | Bhattacharya et al. | |
| 5,585,651 A * | 12/1996 | Kitagawa et al. | 257/139 |
| 5,610,501 A | 3/1997 | Nelson et al. | |
| 5,642,007 A | 6/1997 | Gyugyi et al. | |
| 5,646,511 A | 7/1997 | Akamatsu et al. | |
| 5,698,969 A | 12/1997 | Gyugyi | |
| 5,754,035 A | 5/1998 | Sen | |
| 5,814,975 A | 9/1998 | Nelson et al. | |
| 5,883,796 A | 3/1999 | Cheng et al. | |

(Continued)

OTHER PUBLICATIONS

"Static synchronous series compensator: a solid-state approach to the series compensation of transmission lines," Gyugyi, L.; Schauder, C.D.; Sen, K.K.; Power Delivery, IEEE Transactions on vol. 12, Issue 1, Jan. 1997 pp. 406-417.*

(Continued)

Primary Examiner—Brian Sircus
Assistant Examiner—Brett Squires
(74) Attorney, Agent, or Firm—Foley & Lardner LLP

(57) ABSTRACT

Floating electrically isolated active impedance modules are formed to attach to power transmission lines without breaking the lines such that the power line forms a secondary of the main transformer of the module. Each module includes an electrical energy storage device and a switching circuit, such as a single phase inverter, connected to the storage device and to the main transformer primary winding. The inverter can be controlled to couple a selected voltage to the transmission line through the main transformer primary winding which can provide effective positive impedance, negative impedance, or a voltage at or near phase quadrature with the line current. Many active impedance modules may be distributed over a power system grid to allow control of the impedance of the power lines in the grid and to steer power through the grid, with each module electrically isolated from ground and from other phase lines of the transmission system.

32 Claims, 5 Drawing Sheets

U.S. PATENT DOCUMENTS

| | | | |
|---|---|---|---|
| 5,905,367 | A | 5/1999 | Hochgraf |
| 6,087,916 | A | 7/2000 | Kutkut et al. |
| 6,118,676 | A | 9/2000 | Divan et al. |
| 6,172,488 | B1 | 1/2001 | Mizutani et al. |
| 6,396,172 | B1 | 5/2002 | Couture |
| 6,462,518 | B1 | 10/2002 | Fischer et al. |
| 6,486,569 | B1 * | 11/2002 | Couture ................. 307/98 |
| 2003/0006652 | A1 | 1/2003 | Couture |

OTHER PUBLICATIONS

D.M. Divan, "Nondissipative Switched Networks for High-Power Applications," Electronics Letters, vol.20, No. 6, Mar. 15, 1984, pp. 277-279.

Laszlo Gyugyi, "Dynamic Compensation of AC Transmission Lines by Solid-State Synchronous Voltage Sources, " IEEE Transactions on Power Delivery, vol.9, No. 2, Apr. 1994, pp.904-911.

L. Gyugyi, et al., "The Unifies Power Flow Controller: A New Approach to Power Transmission Control," IEEE Transactions on Power Delivery, vol.10, No. 2, Apr. 1995, pp. 1085-1097.

Narain G. Hingorani, "Introducing Customer power," IEEE Spectrum, Jun. 1995, pp. 41-48.

F.D. Galiana, et al., "Assessment and Control of the Impact of Facts Devices on Power System Performance," IEEE Transactions on Power Systems, vol. 11, No. 4, Nov. 1996, pp. 1931-1936.

Hirohito Funato, et al., Realization of Negative Inductance Using Variable Active-Passive Reactance (VAPAR), IEEE Transactions on Power Electronics, vol. 12, No. 4, Jul. 1997, pp. 589-596.

C. Schauder, et al., "Operation of ±100 MVAR TVA STATCON, "IEEE Transactions on Power Delivery, vol. 12, No. 4, Oct. 1997, pp. 1805-1811.

A.S. Mehraban, et al., "Installation, Commissioning, and Operation of the World's First UPFC on the AEP System, " IEEE, Apr. 1998, pp. 323-327.

C.D. Schauder, et al., "Operation of the Unified Power Flow Controller (UPFC) Under Practical Constraints," IEEE Transactions on Power Delivery, vol.13, No. 2, Apr. 1998, pp. 630-639.

Laszlo Gyugyi, et al., "The Interline Power Flow Controller Concept: A New Approach to Power Flow Management in Transmission Systems," IEEE Transactions on Power Delivery, vol. 14, No. 3, Jul. 1999, pp. 1115-1123.

B.A. Renz, et al., "AEP Unified Power Flow Controller Performance," IEEE Transactions on Power Delivery, vol. 14, No. 4, Oct. 1999, pp. 1374-1381.

P.K. Dash, et al., "Digital Protection of Power Transmission Lines in the Presence of Series Connected FACTS Devices," Power Engineering Society Winter Meeting, 2000.

Joseph Mutale, et al., "Transmission Network Reinforcement Versus FACTS: An Economic Assessment," IEEE Transactions on Power Systems, vol.15, No. 3., Aug. 2000, pp. 961-967.

Carsten Lehmkoster, "Security Constrained Optimal Power Flow for an Economical Operation of FACTS-Devices in Liberalized Energy Markets," IEEE Transactions on Power Delivery, vol. 17, No. 2, Apr. 2002, pp. 603-608.

H.V. Hitzeroth, et al., Compensation, Stability and Losses in the Presence of Wheeling Transactions with use of FACTS Devices, p. 149.

* cited by examiner

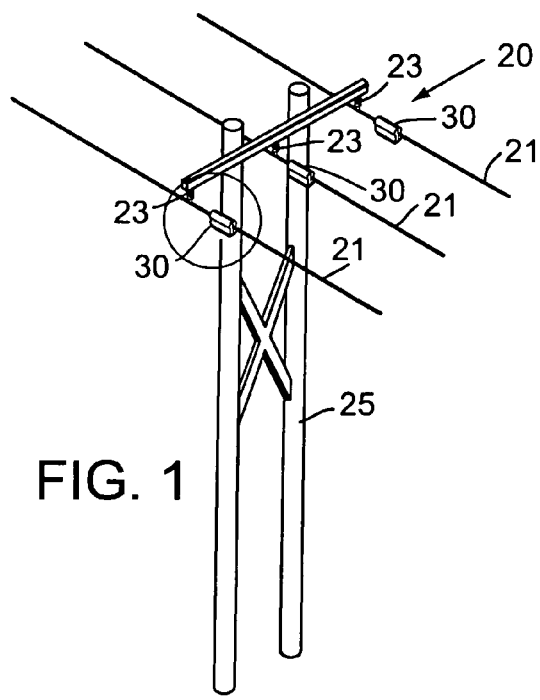
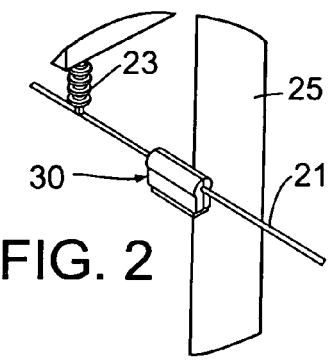
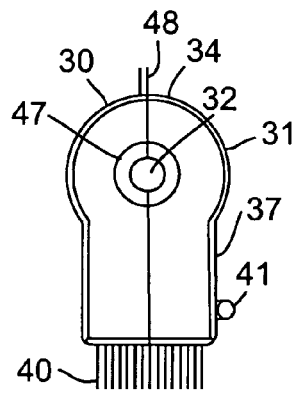
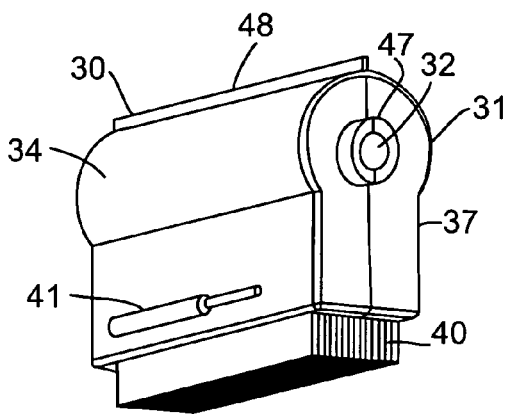
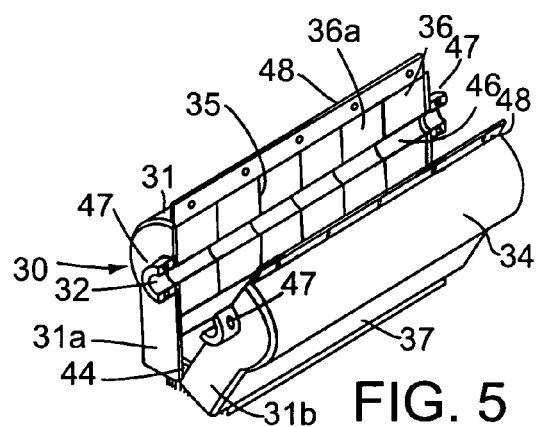

DISTRIBUTED FLOATING SERIES ACTIVE IMPENDANCES FOR POWER TRANSMISSION SYSTEMS

FIELD OF THE INVENTION

This invention pertains generally to the field of electrical power transmission systems and particularly to the control of power flow in power transmission systems.

BACKGROUND OF THE INVENTION

Electrical power distribution systems are formed of a complex interconnected system of generating plants, substations, and transmission and distribution lines. Large power systems such as those in the United States and Canada are of great complexity and can be vulnerable to power disruption events that propagate through the system. To meet the increasing demand for electrical power and to reduce the vulnerability of the power systems to disturbances, it will be necessary to substantially increase transmission capacity. Building new transmission lines is both costly and time consuming, with several years generally being required to complete the land acquisition, permitting, and construction processes.

Transmission and distribution lines normally are passive systems, using designs that date back many years. Existing passive transmission systems generally are not well-suited to controlling power flow from a generating site to a particular customer. The existing systems are also subject to "loop flow," wherein electricity flows along its path of least impedance and not along a desired contract path, which results in transmission line congestion, wheeling losses, inability to fulfill electricity supply contracts, and increased transmission loading relief (TLR) requests. Adding new generation to existing transmission networks can also cause loop flows and fault protection coordination problems, with resulting poor utilization of both generation and transmission assets.

Furthermore, AC power transmission systems are inherently subject to relatively high losses when transmitting power over very long distances—several hundred to 1,000 miles or more—which has led to the limited use of high voltage DC power transmission lines and proposals for the use of superconducting lines in the future. However, such proposals for alternatives to AC transmission lines are of uncertain practicality and, if feasible at all, would require very large investments and would not be operational for several years.

Thus, in the near term, it would be highly desirable to be able to improve the capacity of the existing AC transmission infrastructure at reasonable cost. AC transmission lines typically operate well below thermal limits because of limits imposed by reliability or stability considerations, so that existing lines could potentially carry significantly more power if non-thermal constraints could be reduced.

Several technical solutions have been proposed to increase the capacity of existing AC transmission systems. Most of these proposals relate to what is known as "Flexible AC Transmission Systems" (FACTS). Although technically viable, FACTS systems have not been commercially feasible to date because of the high cost of such systems. These high costs are due to several factors, including high power ratings (20 to 100 MVA), which require the use of high power GTO devices in custom designs, making the overall system expensive to design, build, commission and operate. High voltage ratings (as high as 345 kV) require expensive insulation and isolation requirements, and fault protection coordination requirements create high component stress, again resulting in high system cost. The proposed FACTS systems have generally involved a single installation, or at most a handful of installations, of relatively large size (similar to a substation) yielding a critical single point of failure, with resulting poor reliability and potential unavailability. As a consequence, the FACTS approach has not been implemented in a widespread commercial manner.

SUMMARY OF THE INVENTION

In accordance with the invention, floating active impedance modules are formed to attach to power transmission lines without breaking the lines such that the power line forms a secondary of a main transformer of the module. Each of the active impedance modules includes a switching circuit connected to the primary of a single phase transformer formed to attach to a power transmission line without breaking the line. The switching circuit has gate controlled switches connected to an electrical energy storage device, with the switching of the switches controlled so as to realize a desired essentially non-dissipative impedance characteristic in the transmission line. The active modules may comprise an electrical energy storage capacitor, and a single phase inverter connected to the capacitor to exchange power therewith and connected by its output lines to the main transformer primary winding. A controller connected to the inverter controls the switching of the inverter to provide selected transfer of instantaneous power between the main transformer primary winding and the electrical energy storage device to provide a selected impedance coupled to the transmission line through the main transformer primary winding. The effective impedance injected into the transmission line at the transformer is essentially non-dissipative and may be a positive inductance, a negative inductance, or a capacitance, achieved through injection of a voltage at or near a phase angle in quadrature with the line current. The active module is electrically isolated from ground and from other phase lines of the transmission system. The inverter thus floats at the line voltage and does not need a potential reference point.

In operation, the active impedance module of the invention may initially derive control power utilizing a current transformer until operation of the inverter is initiated. With the inverter operating, control power can be drawn from the inverter DC bus. Because the controller is isolated from ground and from other transmission lines, high voltage insulation is not required for the controller even for use with very high voltage transmission lines. Because the module is electrically isolated, the net average power into and out of the module is zero (other than for losses in the circuitry and in the transformer). The module is capable of operating in several modes: a reactive impedance (positive inductance or capacitance); an active impedance (a negative inductance or capacitance); or a voltage source that is orthogonal to the current in the transmission line. In accordance with the invention, multiple modules may be installed at distributed locations in a transmission system to allow the flow of power through the transmission system to be controlled. The operation of the individual modules may be controlled and coordinated utilizing an isolated communications link such as a radio receiver (and preferably a transmitter) incorporated in each module, or through use of other commercially available communications systems such as power line communications. In addition, for transient or fault conditions requiring a fast response, or upon failure of the communications channel, the module may be operated autonomously with a control strategy that benefits overall system operations, such as providing effective inductive impedance in the transmission line during fault conditions to limit fault current or producing an arbitrary impedance that is dependent on line current magnitude.

As an example of the operation of the active impedance modules of the invention, under normal system conditions the modules may be controlled to inject a negative inductance into the line to compensate for the line impedance, thereby increasing the power throughput capability of the line so that the transmission line can operate closer to its thermal limits. Such active impedance injection is preferable to conventional solutions, such as series capacitor compensation, since installation of the impedance module does not require cutting into or otherwise physically changing the transmission line, and the system stability problems that can lead to sub-synchronous resonance when using series capacitor compensation can be avoided. Injection of positive or negative inductance can be used to help steer currents in directions at interconnection points of multiple sets of transmission lines, or within a meshed network. When a module is controlled to inject a positive inductance into a transmission line, the current is effectively "pushed" from the line to other parts of the transmission grid. When the module is controlled to inject a negative inductance, current is effectively "pulled" from other parts of the grid. Upon detection of a fault in the transmission line (characterized by a steep increase in current to fault current levels), the module may be operated to automatically inject a positive inductance into the line to help limit fault currents.

The invention may be implemented to control loop flows, thereby reducing congestion on existing lines so that they can effectively transmit more power. Appropriate control of the modules can be used to guide current along a preferred path through the transmission grid. In addition to optimizing transmission system efficiency, the invention may be utilized to balance phase currents and to inject harmonic voltage to help block harmonic current flows.

The present invention can be utilized at substantially lower cost than conventional FACTS systems because of the elimination of the need for high voltage insulation and because of relatively simple installation and commissioning of the modules. The utilization of a large number of standardized modules allows the use of mass manufacturing techniques and lowered cost of production for individual modules. Very high reliability can be achieved since a large number of the active impedance modules (in the hundreds or more) may be utilized, so that the failure of one or a few modules will have minimal effect on the system as a whole, and can be compensated for by appropriate control of the remaining modules. Conversely, where "N" modules are in place, an additional "M" modules may be deployed to achieve a desired N+M reliability level. The use of the active modules in accordance with the invention allows an increase in the steady-state line capacity while allowing control of the power flow and control of fault currents. Because the modules can be easily installed without having to physically disrupt existing power lines, and can be effectively installed in an incremental manner, the deployment of the active modules can be carried out with little or no risk to the power transmission system, allowing trial and validation of the system at low cost and low risk. These features also allow the number of units deployed to be increased as the economics permit. Furthermore, the individual modules are portable and can be decoupled from a transmission line, and reinstalled at another more advantageous location, if desired.

Further objects, features and advantages of the invention will be apparent from the following detailed description when taken in conjunction with the accompanying drawings.

BRIEF DESCRIPTION OF THE DRAWINGS

In the drawings:

FIG. 1 is a perspective view of a typical set of three-phase transmission lines illustrating the installation of active impedance modules in accordance with the invention.

FIG. 2 is an isolated view of one of the modules installed on a transmission line.

FIG. 3 is a perspective view of an exemplary active impedance module of the invention.

FIG. 4 is an end view of the active impedance module of FIG. 3.

FIG. 5 is a perspective view of the active impedance module of FIG. 3 shown with the module in its open position which permits the primary transformer winding of the module to be clamped onto a transmission line.

DETAILED DESCRIPTION OF THE INVENTION

Figure 6:
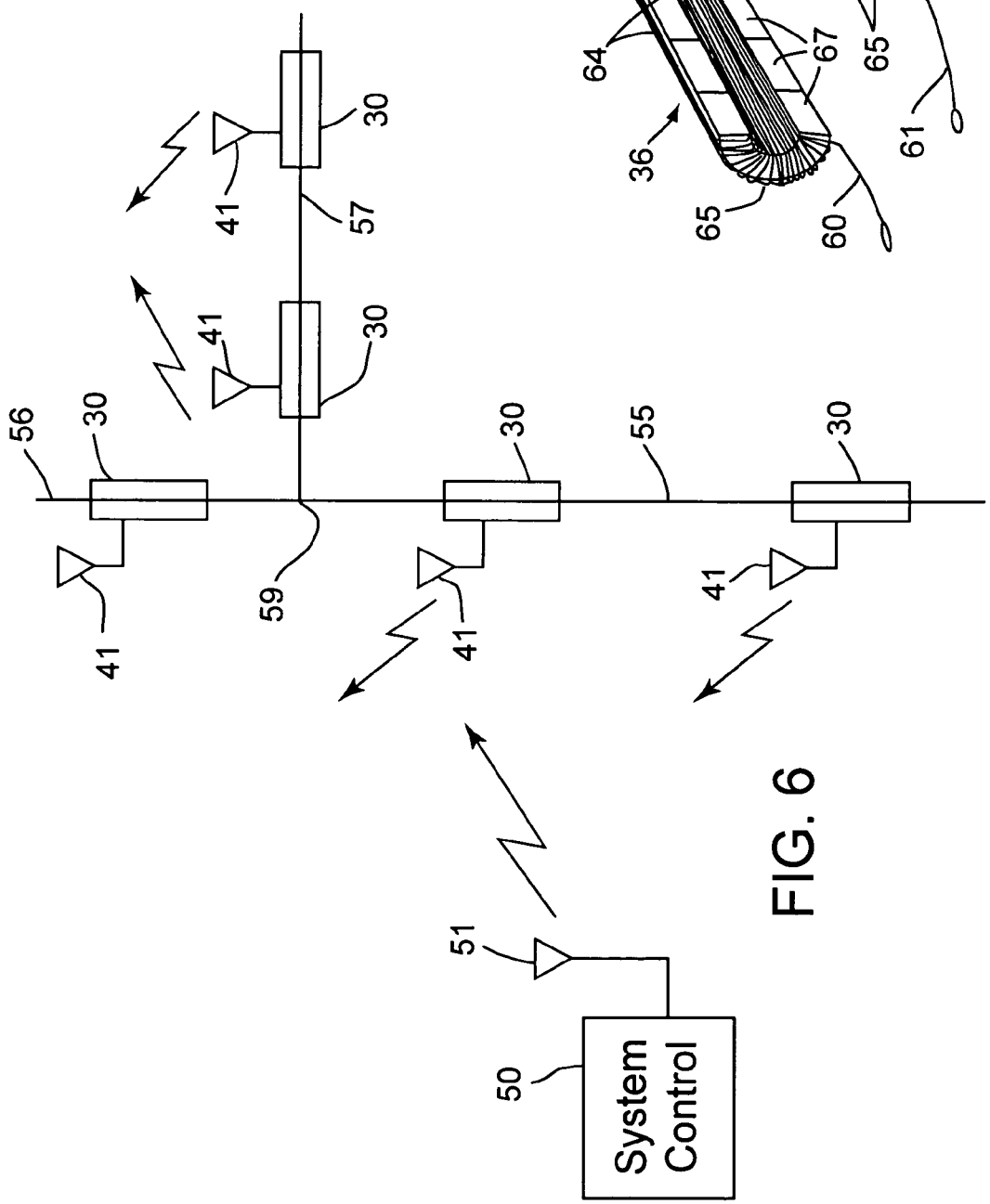
FIG. 6 is a schematic diagram of a power transmission system with active impedance in accordance with the invention.

With reference to the drawings, FIG. 1 illustrates a set 20 of power transmission lines composed of three conducting lines 21 supported in a conventional manner by insulators 23 on support towers illustratively shown at 25. Individual transmission lines 21 carry current for each phase of a three-phase power transmission system in a conventional manner, and may operate at high voltages typical of long distance transmission systems, e.g., 138 kV to 750 kV. In accordance with the present invention, an active impedance module 30 is attached to each of the transmission lines 21 preferably, but not necessarily, near to the insulators 23 which support the power lines 21. As discussed further below, the active modules 30 are formed to attach to a power transmission line without requiring any physical modification or break in the power line. As illustrated in FIGS. 1 and 2, the impedance modules 30 preferably are solely supported by the power lines 21 and are neither physically connected to nor electrically connected to ground or to other power lines. Thus, the modules 30 are totally electrically isolated and effectively float at the voltage of the power line 21 to which they are attached. Alternatively, if desired, the modules 30 may be supported by the insulators 23 and may serve to support the power lines at the support towers 25.

An exemplary mechanical construction for the active impedance modules 30 is shown in FIGS. 3–5. The example module 30 of FIGS. 3–5 has an outer housing 31 with openings 32 at each end of the housing through which a transmission line 21 (not shown in FIGS. 3–5) passes. A portion 34 of the housing surrounds and contains a main transformer primary winding 35 (discussed further below) while another portion 37 of the housing encloses power electronics and other components of the system, as discussed further below. The modules may also include heat sink fins 40 for dissipating heat from the electronic components within the housing and an antenna 41 for receiving radio signals that allow control of the operation of the module 30 and, if desired, transmittal of data concerning the state of the module and of the power line to which it is attached. The electronic components within the housing 31 are preferably shielded from the high electric fields from the power lines (e.g., with a faraday shield that surrounds the electronics in the housing).

An exemplary construction for the active impedance module 30 to allow attachment to a power line 21 without physically disrupting the line is shown in FIG. 5. As illustrated therein, the housing 31 is formed in two halves 31a and 31b which may be connected to pivot about a hinge 44 at the bottom of the housing 31. The main transformer primary winding 35 is wound on a core 36 of appropriate magnetic material (e.g., soft iron or laminated steel) formed in two halves 36a and 36b, with each half of the transformer primary core preferably having a semi-cylindrical groove 46 formed therein which extends between the two end openings 32 of the housing and which is sized and formed to fit over the power line 21 to which the module is to be attached. Other geometries may be used for the core to accommodate the power line within the core. Separate modules may be used for each wire of multiple wire phase lines, or a single module may be formed to couple to each of the wires in the phase. Insulation or padding may be used to cover the core 36 and the wires of the winding 35 within the groove 46 to separate the wires from contact with the power line 21. To install the module as shown in FIG. 5 on a power line 21, the module in its open position is raised up to the position of the power line 21, and the two halves 31a and 31b of the housing are then closed together to engage the two halves 36a and 36b of the transformer primary core together so that the power line fits within the opening defined by the grooves 46. In accordance with the invention, the power line 21 is surrounded by the primary winding 35 and the core 36, and forms the secondary winding of the main transformer. The module 30 can be locked in its closed position engaged over the power line 21 utilizing a snap engagement lock, a band, a locking screw, or any other structure for securely holding the two halves of the module together and in engagement with the power line 21. For example only, as shown in FIG. 5, the housing 31 may include split collars 47 at each end of the housing that clamp onto the power line when the housing is closed, and mating flanges 48 at the top of each housing half 31a and 31b which can be secured together with screws.

In the present invention, the active impedance modules 30 are preferably mounted at many distributed positions on a set of power transmission lines, so as to provide a large number of distributed active impedances that are controllable to change the effective impedance of the power transmission lines for various purposes. For power transmission systems having multiple sets of lines extending over hundreds of miles, several hundreds or thousands of the modules 30 can be mounted at appropriate positions to the transmissions lines. As illustrated in FIG. 6, each of the modules 30 communicates with a central system controller 50 via, for example, a radio frequency link between the antenna 41 of the impedance modules and an antenna 51 of the system controller 50. The radio frequency link may be, for example, a conventional cellular telephone system such as CDMA (code division multiple access) or a proprietary wireless network. Other communications link technology, such as power line communications, may also be utilized, although it is preferred that there be no physical connection between individual modules or between the modules 30 and the system control 50. The system control 50 may be implemented with a central control which provides commands to a regional controller which is responsible for controlling a local network. The status of the power system may be monitored and evaluated over time, for example, utilizing distributed monitors such as those utilized in the I-Grid® System provided by Soft Switching Technologies, Inc. of Middleton, Wis. As illustrated in FIG. 6, the power transmission system may include multiple sets of power lines as illustrated schematically at 55, 56 and 57 (each of which comprises a set of three-phase transmission lines and associated support, etc.), with the sets of power lines 55, 56 and 57 meeting at an intersection 59. For example, power may be generated at a distant generating plant and provided on the set of power lines 55 and then transmitted to consumers over the sets of power lines 56 and 57. By appropriate control of the active impedance modules 30, the flow of power from the lines 55 to the lines 56 and 57 can be controlled to partially divert power from one of the sets of lines 56 or 57 to the other set of lines.

Figure 7:
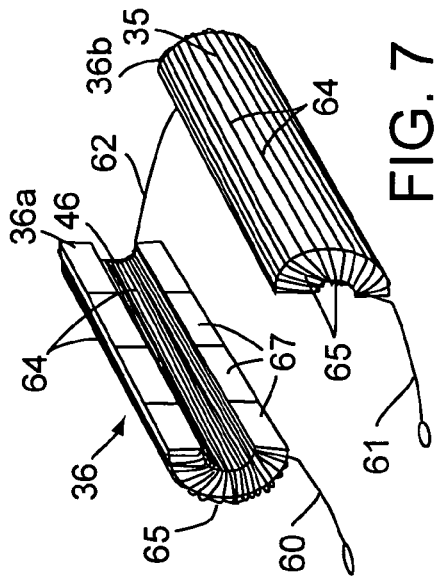
FIG. 7 is an illustrative view of a split transformer primary core that may be used in the module of FIG. 3.

One illustrative embodiment of the main transformer primary winding 35 and core 36 is illustrated in FIG. 7. The wires of the winding 35 wound on the two halves 36a and 36b of the core are connected between conducting lines 60 and 61, with a conducting wire 62 connecting the portions of the winding 35 that are wound on the two halves 36a and 36b of the transformer core. When the two halves 36a and 36b of the core are engaged together, the winding 35 forms a toroidal shaped winding which extends around the cylindrical opening formed by the two semi-cylindrical grooves 46 through which the power line 21 will pass. The winding 35 has multiple turns of conducting wire which may be wound about the core 36, with each turn having longitudinal sections 64 of conducting wire extending longitudinally in a direction parallel to the length of the power line 21, and with end sections 65 of the conducting wires connecting the longitudinal sections of the windings, effectively forming a coaxial winding transformer in which the transmission line forms the secondary. Various turns ratios between the primary winding 35 and the single turn transmission line secondary may be utilized, an example being 50:1, but any desired turns ratio may be used. Each of the core halves 36a and 36b may be formed as a single unit, or the two halves may be formed of several individual core segments 67. Other winding configurations may also be utilized, including a toroid having a single split region which can be expanded to allow the toroidal coil to fit over a wire, or a full toroid coil which can be strung onto a transmission line where access to an end of the transmission line is available.

Figure 8:
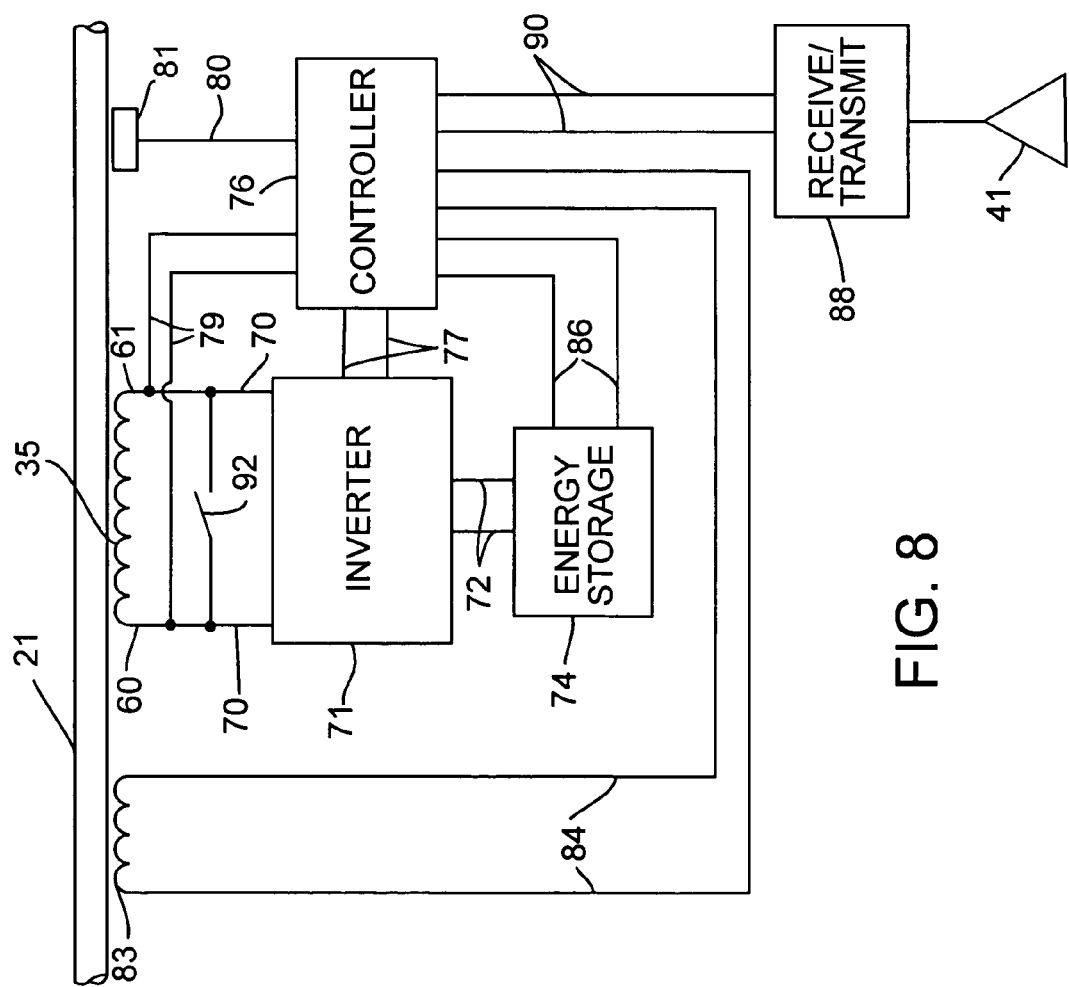
FIG. 8 is a functional block diagram of an example of an active impedance module system in accordance with the invention.

A block diagram illustrating the functional electrical and electronic components of an embodiment of the active module 30 is shown in FIG. 8. The main transformer primary winding 35 is connected by lines 70 to a switching circuit configured as an inverter 71 which is itself connected by lines 72 to an energy storage device 74. The inverter 71 receives control signals from a controller 76 on lines 77. The controller 76 controls the switching of the switching devices in the inverter 71 to provide a voltage across the transformer primary 35 that is at a selected phase and frequency to couple to the power transmission line 21 as an apparent impedance of a selected value. The controller receives the voltage across the transformer 35 from lines 79 and receives a signal on a line 80 from a current sensor 81 which may be connected to the transmission line 21 or to the main transformer winding to sense the current flowing through the transmission line. A current transformer 83 auxiliary winding may be coupled to the line 21 (separately or on the main transformer winding) to receive power thereon, which is transmitted via lines 84 to the controller 76 to provide initial start-up power to the controller, after which the controller may receive power from the energy storage device 74 via lines 86 to provide control power. The lines 86 also provide feedback to the controller 76 of the status of the energy storage device 74 such that the controller can control the switching of the inverter 71 to maintain a regulated voltage or current in the energy storage device. A radio receiver/transmitter 88 is connected to the antenna 41 and provides control signals on signal lines 90 to the controller 76. The controller 76 may also provide signals to the receiver/transmitter 88 representing, for example, the state of the module 30 and conditions on the power line 21, such as the magnitude and frequency of current sensed by the current sensor 81. A bypass switch 92 may be connected between the lines 70 to short out the transformer primary 36 when the module 30 is not operating so as to provide a minimal impedance coupled to the transmission line 21 when the module is inactive.

Figure 9:
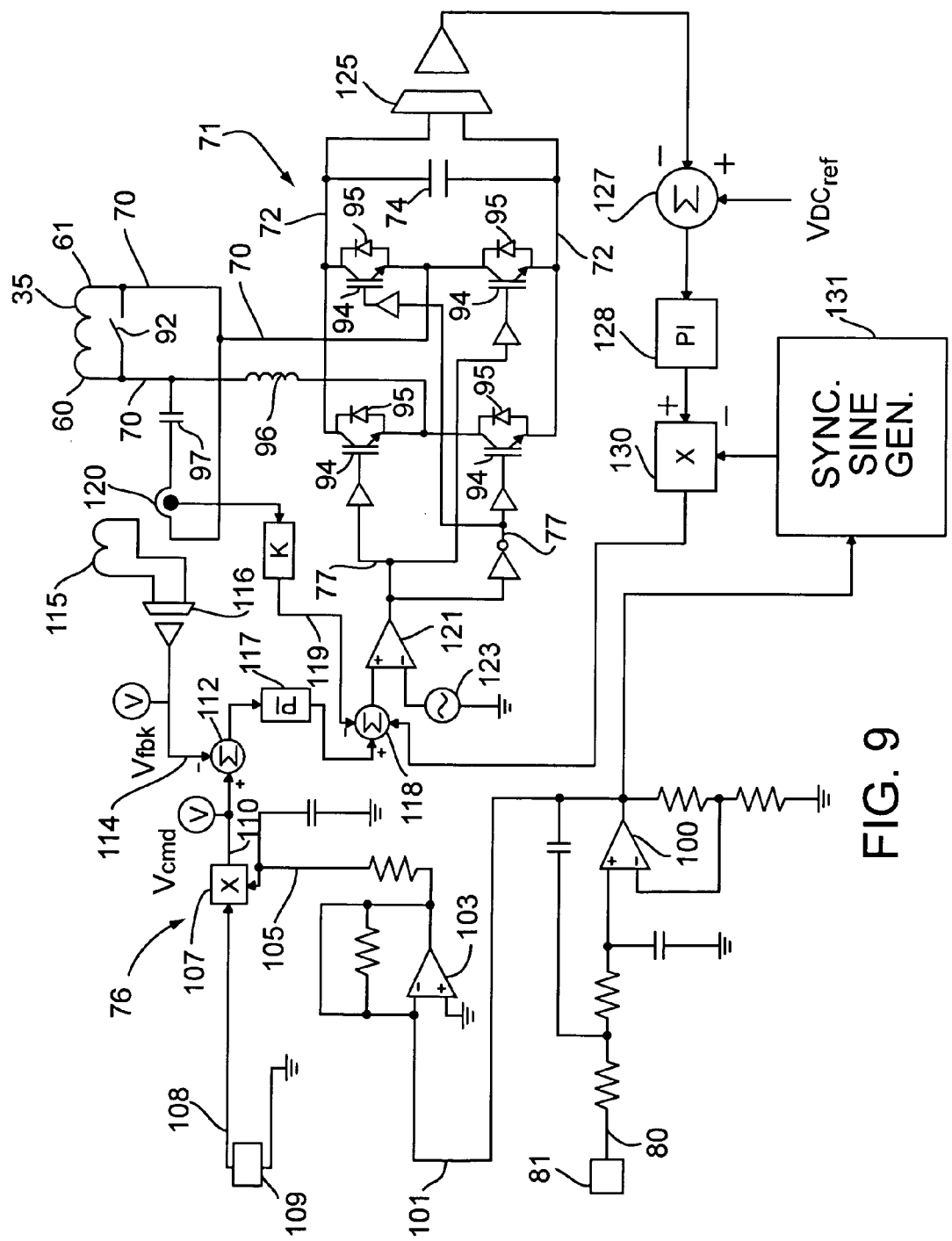
FIG. 9 is a schematic diagram of an example of an inverter and controller that may be utilized in the active impedance module of the invention.

FIG. 9 is a schematic circuit diagram illustrating one implementation of the inverter and controller of FIG. 8. It is understood that this is one exemplary implementation of the inverter and controller and any other implementation may be utilized in a manner in accordance with the invention. As shown in FIG. 9, the inverter 71 is a single phase inverter formed in an H-bridge configuration of gate controllable switching devices 94 which, as shown in FIG. 9, may comprise insulated gate bipolar transistors (IGBTs), with an anti-parallel diode 95 connected across each of the IGBTs 94. The bridge of switches 94 is connected across the lines 72, which in this configuration comprise DC bus lines which are connected to an energy storage capacitor 74 as the energy storage device. The switching devices 94 are connected to transfer power from the DC bus lines 72 and to transfer AC power on the inverter output lines 70. An output filter composed of a series inductor 96 and parallel capacitor 97 may be connected to the output lines 70 to filter the output current provided to the transformer winding 35. The controller 76 provides the gate control switching signals for the switching devices 94 on the lines 77. As shown in FIG. 9, the controller 76 receives a voltage signal that is proportional to line current on the line 80 from the sensor 81, and that signal is passed through a second order filter formed of an operational amplifier 100 with associated resistors and capacitors. Although not shown, the current transformer (sensor) 81 may be terminated in a series pair of burden resistors to provide both a positive and inverted signal proportional to line current. The second order filter is used to remove from the signal high frequencies and noise that are outside of the desired control range of the system. The output signal from the filter is fed on a line 101 to a differentiator circuit formed with an amplifier 103 and associated capacitors and resistors. The differentiator circuit provides a reference signal on a line 105 that mimics inductor voltage $$\left( L \frac{di}{dt} \right).$$

The reference signal is fed to a multiplier 107, which also receives a voltage or impedance magnitude command on a line 108 from a reference command circuit 109 that may be provided via the receiver/transmitter 88. The reference point can be provided via the RF link to the receiver 88 or it can be autonomously programmed in as a function of local parameters. The output of the multiplier 107 is provided on a line 110 to a summer 112, which also receives the main transformer primary voltage feedback signal on a line 114 provided from a tertiary winding 115 through an isolation amplifier 116. The feedback from the tertiary winding 115 coupled to the transmission line 21 is used to close the output voltage loop. The controller uses a proportional-integral (PI) control scheme with active output filter damping to regulate the voltage produced by the H-bridge inverter 71. The output of the summer 112 (voltage error) is provided to the PI controller 117, the output of which is provided to a summer 118. The summer 118 also receives a proportional signal on a line 119 from a current sensor 120 connected in series with the output filter capacitor 97 to close the damping loop. The output of the summer 118 (the voltage modulator command) is provided to a comparator 121 which also receives a carrier signal (e.g., at 12 kHz) from a triangle wave generator 123 to provide a pulse width modulated output signal to the control lines 77 to switch the switching devices 94. To provide DC bus voltage regulation, the voltage across the DC bus lines 72 is provided to an isolation amplifier 125 the output of which is supplied as the negative output to a summer 127 which receives as a positive input a DC voltage reference $V_{DC\ Ref}$. The output of the summer 127, corresponding to the DC bus error, is provided to a proportional-integral controller 128 which supplies its output to a multiplier 130. The multiplier 130 also receives the output of a synchronous sine wave generator 131. The sine wave generator 131 receives the filtered output signal 101 from the amplifier 100 to provide a fixed sine wave reference synchronized to the 60 Hz component of the transmission line current. The output of the multiplier 130 corresponds to the "real" component of the inverter voltage command such that power may be absorbed from line current to hold the DC bus voltage constant, that is, to transfer power from the power line to cover the losses in the inverter, transformer and the control electronics. This output signal is supplied to another input of the summer 118.

Figure 10:
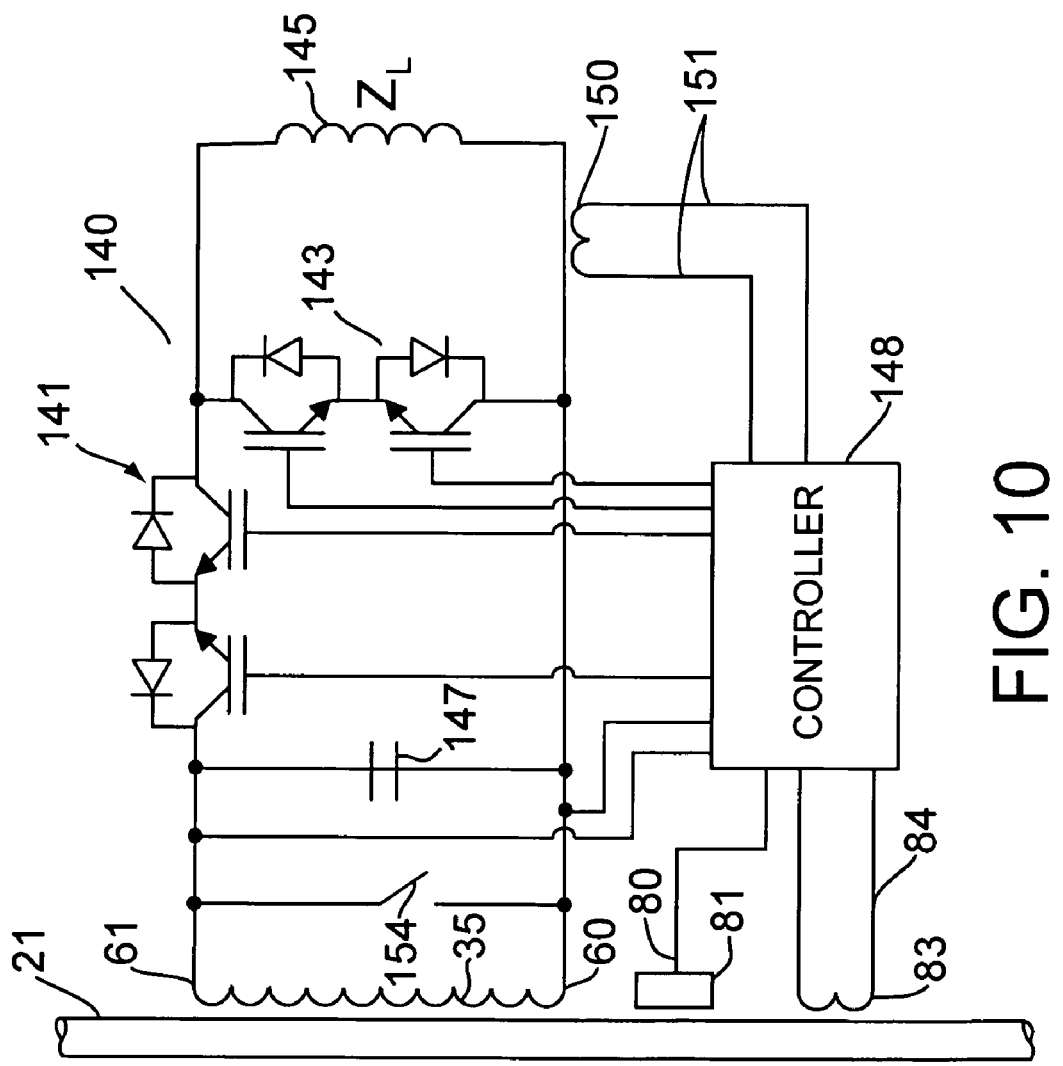
FIG. 10 is a functional schematic diagram of another example of an active impedance module in accordance with the invention.

An active impedance module 30 of the present invention may also be implemented, if desired, to provide simplified operation with a more limited choice of impedance that may be provided to the power line via the module. An example of the functional electrical and electronic components of such a module is shown in FIG. 10. The transformer primary 35 is coupled to the power line 21 (as the secondary, e.g., as discussed above), and the lines 60 and 61 of the primary 35 are connected to a switching circuit 140 composed of a series bidirectional switch 141 and a parallel bidirectional switch 143. The switches 141 and 143 may be formed, for example, of back-to-back IGBTs, each with anti-parallel diodes, as shown in FIG. 10, or with any other appropriate implementation. An inductor 145 of impedance $Z_L$ is connected across the parallel switch 143 and functions as an electrical energy storage device. An output filter capacitor 147 may be connected across the transformer lines 60 and 61. A controller 148 is connected to the gates of the IGBTs in the switches 141 and 143, and it may be connected to receive a signal from a transmission line current sensor 81 and to receive the voltage across the lines 60 and 61 from the primary winding. A current transformer 83 may be connected to the controller to provide power thereto, as discussed above, and a current transformer 150 can be connected by lines 151 to the controller to allow monitoring of the current through the inductor 145. The controller provides signals to switch the switches 141 and 143 alternately on and off, so that when the series switch 141 is on (conducting) the parallel switch 143 is off (non-conducting) and vice versa. Thus, if the duty cycle (ratio of on time to a full cycle) of the switch 141 is d, the duty cycle of the parallel switch 143 is (1–d). The controller may be implemented as a pulse generator of pulse duty cycle d, with the pulse output signal provided directly to the series switch 141 and through an inverting amplifier to the parallel switch 143. The effective impedance injected into the line 21 is thus $$Z_{eq} = \frac{Z_L}{d},$$

as reflected through the turns ratio of the transformer primary 35. The controller 148 can thus control the duty cycle to control the effective inductance injected into the power line 21, either in response to commands via a communications link from a central control as discussed above, or in response to the current in the line 21 as sensed by the current sensor 81 (e.g., to inject maximum inductance during a fault condition). Other reactances may be utilized as the energy storage device if desired. A bypass switch 154 may be connected across the primary 35 to minimize the impedance applied to the power line 21 when the module is turned off.

It is understood that the invention is not confined to the particular embodiments set forth herein as illustrative, but embraces all such forms thereof as come within the scope of the following claims.

What is claimed is:

1. An active module for attachment to a power transmission line of a transmission system comprising:
   (a) a single phase main transformer primary formed to attach to a power transmission line without breaking the line such that the power line forms the secondary of the main transformer;
   (b) an electrical energy storage device;
   (c) a switching circuit formed of gate controlled switching devices connected to the electrical energy storage device to exchange power therewith and having output lines connected to the main transformer primary; and
   (d) a controller connected to the switching devices in the switching circuit to control the switching of the switching devices for transfer of power between the main transformer primary and the electrical energy storage device to provide a selected impedance injected in the transmission line coupled through the main transformer primary, the module electrically isolated from ground and from other phase lines of the transmission system.

2. The active module of claim 1 wherein the main transformer primary has a winding which comprises multiple turns of wire wound in a toroidal shape with sections of the wire extending in a longitudinal direction parallel to the transmission line when the transformer primary winding is mounted on the transmission line.

3. The active module of claim 1 wherein the transformer primary has a core that is split longitudinally into sections so that it can be opened up to allow the transformer primary core to fit over a transmission line and to close the sections of the transformer primary core together to mount the transformer primary winding to the transmission line.

4. The active module of claim 1 wherein the switching circuit and the controller are contained in a housing connected to the main transformer primary winding so that all components of the active module are supported by the transmission line to which the primary transformer winding is mounted while being electrically isolated from ground and from any adjacent transmission lines.

5. The active module of claim 4 including a radio receiver mounted in the housing and connected to the controller to provide command signals to the controller transmitted through a radio communications link to the radio receiver.

6. The active module of claim 1 wherein the switching circuit is an inverter formed of gate controlled switching devices connected in a bridge configuration, the inverter connected between DC bus lines that are connected to the electrical energy storage device.

7. The active module of claim 6 wherein the gate controlled switching devices are IGBTs, and including an anti-parallel diode connected across each IGBT.

8. The active module of claim 6 wherein the electrical energy storage device is a capacitor.

9. The active module of claim 6 wherein the controller controls the inverter to provide voltage coupled through the primary transformer winding to the transmission line that selectively appears as positive inductance, negative inductance, or voltage at quadrature to the transmission line current at the position of the transformer primary.

10. The active module of claim 9 wherein the controller controls the inverter so that losses in the inverter are supplied by power drawn from the transmission line.

11. The active module of claim 6 including an auxiliary transformer winding adapted to be coupled to a transmission line without breaking the line and to draw power therefrom and to supply power at output terminals thereof to the controller.

12. The active module of claim 1 wherein the controller includes a sensor for sensing the current through a power transmission line, and wherein on detection of a fault current in the power transmission line, the controller controls the switching circuit to inject a positive inductance into the transmission line to help limit the fault current.

13. The active module of claim 1 wherein the main transformer primary has a winding which has multiple turns of wire.

14. An active module for attachment to a power transmission line of a transmission system comprising:
   (a) a single phase main transformer primary formed to attach to a power transmission line without breaking the line such that the power line forms the secondary of the main transformer;
   (b) an electrical energy storage device;
   (c) a switching circuit formed of gate controlled switching devices connected to the electrical energy storage device to exchange power therewith and having output lines connected to the main transformer primary; and
   (d) a controller connected to the switching devices in the switching circuit to control the switching of the switching devices for transfer of power between the main transformer primary and the electrical energy storage device to provide a selected impedance injected in the transmission line coupled through the main transformer primary, the module electrically isolated from ground and from other phase lines of the transmission system;
   wherein the electrical energy storage device is an inductor, and wherein the switching circuit comprises a series switch connected in series between the main transformer primary and the inductor, and a parallel switch connected in parallel with the inductor, the controller connected to the series switch and the parallel switch to switch them alternately with a duty cycle d for the series switch and a duty cycle (1–d) for the parallel switch.

15. The active module of claim 14 wherein the series switch and the parallel switch each comprise back to back IGBTs with an anti-parallel diode connected across each IGBT.

16. An active module for attachment to a power transmission line of a transmission system comprising:
   (a) a single phase main transformer primary formed to attach to a power transmission line without breaking the line such that the power line forms the secondary of the main transformer wherein the main transformer primary has a winding which comprises multiple turns of wire with sections of the wire extending in a longitudinal direction parallel to the transmission line when the transformer primary winding is mounted on the transmission line;
   (b) an electrical energy storage capacitor;
   (c) a single phase inverter connected by DC bus lines to the electrical storage capacitor to exchange power therewith and having output lines connected to the main transformer primary winding, wherein the inverter is formed of gate controlled switching devices connected in a bridge configuration, the inverter connected between the DC bus lines that are connected to the electrical storage capacitor; and
   (d) a controller connected to the inverter to control the switching of the inverter switching devices for transfer of power between the main transformer primary winding and the electrical storage capacitor to provide a selected impedance in the transmission line coupled through the main transformer primary winding, the module electrically isolated from ground and from other phase lines of the transmission system.

17. The active module of claim 16 wherein the main transformer primary has a core that is split longitudinally in sections so that it can be opened up to allow the transformer primary to fit over a transmission line and to close the sections of the transformer primary core together to mount the transformer primary to the transmission line.

18. The active module of claim 16 wherein the inverter and the controller are contained in a housing connected to the main transformer primary winding so that all components of the active impedance module are supported by the transmission line to which the transformer primary is mounted while being electrically isolated from ground and from any adjacent transmission lines.

19. The active module of claim 18 including a radio receiver mounted in the housing and connected to the controller to provide command signals to the controller transmitted through a radio communications link to the radio receiver.

20. The active module of claim 16 wherein the gate controlled switching devices are IGBTs, and including an anti-parallel diode connected across each IGBT.

21. The active module of claim 16 wherein the controller controls the inverter to provide voltage coupled through the transformer primary winding to the transmission line that selectively appears as positive inductance, negative inductance, or voltage at quadrature to the transmission line voltage at the position of the transformer primary.

22. The active module of claim 21 wherein the controller controls the inverter so that losses in the inverter are supplied by power drawn from the transmission line.

23. The active module of claim 16 including an auxiliary transformer winding adapted to be coupled to a transmission line without breaking the line and to draw power therefrom and to supply power at output terminals thereof to the controller.

24. The active module of claim 16 wherein the controller includes a sensor for sensing the current through a power transmission line, and wherein on detection of a fault current in the power transmission line, the controller controls the inverter to inject a positive inductance into the transmission line to help limit the fault current.

25. The active module of claim 16 wherein the main transformer primary winding has multiple turns of wire.

26. A method of actively injecting a series voltage in a transmission line of a three-phase transmission system comprising:
   (a) coupling a transformer primary winding to one of the phase lines of a high voltage power transmission line without breaking the line so that the transmission line forms the secondary of a transformer that is isolated from the other phase lines and from ground; and
   (b) selectively applying alternating voltage to the primary winding of the transformer to inject voltage in the transmission line at the position of the transformer to effectively provide an impedance in the transmission line wherein the step of coupling a transformer primary winding to one of the phase lines comprises providing a primary transformer winding wound about a split core and engaging the split core over the transmission line to form a primary winding and core that surrounds the transmission line.

27. The method of claim 26 wherein steps (a) and (b) are carried out on each of three phase lines of the three phase power transmission system.

28. The method of claim 26 wherein steps (a) and (b) are applied at multiple locations over a power system transmission grid.

29. The method of claim 28 including controlling the voltage applied to the transformers at the multiple locations on a power transmission grid having multiple sets of three phase transmission lines to divert the flow of power partially from one set of transmission lines to another set of transmission lines.

30. The method of claim 26 including monitoring the current flowing in the transmission line at the transformer to detect fault currents and, when a fault current is detected, applying AC voltage to the transformer primary winding to provide an effective positive inductance in the transmission line at the transformer to help limit the fault current.

31. The method of claim 26 wherein the step of applying alternating voltage to the transformer primary winding is carried out to provide effective positive or negative inductance in the transmission line at the position of the transformer.

32. The method of claim 26 including transmitting a radio frequency signal to control the step of selectively applying voltage to change the alternating voltage applied to the primary winding.

* * * * *

UNITED STATES PATENT AND TRADEMARK OFFICE
CERTIFICATE OF CORRECTION

| | |
|---|---|
| PATENT NO. | : 7,105,952 B2 |
| APPLICATION NO. | : 10/678966 |
| DATED | : September 12, 2006 |
| INVENTOR(S) | : Deepakraj M. Divan, Robert Schneider and William E. Brumsickle |

It is certified that error appears in the above-identified patent and that said Letters Patent is hereby corrected as shown below:

Title Page;
TITLE OF THE INVENTION:

Item (54) in the title of the patent on page 1, and additionally column 1 line 2 of the patent, delete the first "n" in word "impendances" to read --impedances--.

OTHER PUBLICATIONS:

Item (56) on page 2, column 1, line 7, delete the "s" on the end of "Unifies" and replace with a "d" to read --Unified--.

Signed and Sealed this
Fourteenth Day of June, 2011

David J. Kappos
*Director of the United States Patent and Trademark Office*